Patented May 23, 1944

2,349,273

UNITED STATES PATENT OFFICE 2,349,273

PROCESS FOR PREPARING TOCOPHEROLS AND NEW TOCOPHEROL DERIVATIVES

James G. Baxter and Charles D. Robeson, Rochester, N. Y., assignors to Distillation Products, Inc., Rochester, N. Y., a corporation of Delaware No Drawing. Application October 9, 1940, Serial No. 360,455

8 Claims. (Cl. 260—333)

This invention relates to improved procedure for preparing tocopherol and tocopherol derivatives in stable and/or concentrated form.

Tocopherols are known to exist in three different forms which are now known as alpha, beta, and gamma. Concentrates of these different forms and their mode of preparation have been described in the scientific literature. Great difficulty is encountered in preparing tocopherols in pure form. This is particularly true in connection with the free or alcohol form and, as far as is known, it has been impossible to prepare pure free tocopherol without converting it chemically into derivatives which can be more easily isolated and purified. Also tocopherol oxidizes rapidly to form oxidation products having red color. These oxidation products have no vitamin E or antioxidant activity and, as far as is known, are valueless. Serious loss of tocopherol takes place during purification by known methods.

This invention has for its object to provide simplified procedure for preparing tocopherol and its derivatives in relatively purified or concentrated form. Another object is to provide improved purification procedure whereby oxidation of tocopherols is substantially avoided. A further object is to provide new tocopherol products in concentrated or crystalline form which are relatively stable. Other objects will be apparent from the following description and claims.

These and other objects are accomplished in accordance with our invention which includes subjecting the impure mixture which contains tocopherol to an esterification treatment to introduce a fatty acid radical whereby the tocopherol is converted into a stable ester which is resistant to oxidation. When esters with aliphatic acids of eleven or more carbon atoms are formed the reaction product can be purified by crystallization from a solvent to yield an ester which is crystalline at ordinary temperatures. Alternatively to, or in conjunction with the above, the reaction mixture from the esterification step may be passed through an absorption agent whereby the impurities are retained on the adsorbent while the ester passes through and can be recovered from the filtrate. The use of the adsorption step is of particular value if non-crystalline esters are prepared or if the starting material is very impure.

In the following description we have given several of the preferred embodiments of our invention but it is to be understood that these are set forth for the purposes of illustration and not in limitation thereof.

The tocopherol-containing crude employed as a starting material may be produced by the various known concentration methods of the prior art. For instance, a starting material may be obtained by subjecting an oil such as wheat germ, corn, cotton seed, or soy bean oil to saponification under mild conditions. The non-saponifiable material is extracted with a solvent and can be employed directly in accordance with our invention. In Hickman and Baxter application 201,018, filed April 8, 1938, there is described the preparation of natural antioxidant concentrates from vegetable and animal oils containing tocopherol by subjecting them to high vacuum, unobstructed path distillation. The concentrate of tocopherol is separated as a distillate. Our invention is applicable to such distillates as starting materials. In Hickman application 321,913, filed March 2, 1940, there is disclosed the preparation of tocopherol concentrates from sludges, scums, and like by-products produced by condensing the volatile matter contained in the carrier gas of a vegetable or animal oil deodorizing plant. Our invention is especially useful for preparing pure tocopherol preparations from these materials since they frequently contain rather large amounts of impurities which are difficult to remove.

The sterol content of the starting material depends largely upon the source. However, in general we prefer to remove sterols more or less completely as a preliminary step. However, this step is not required even with relatively large amounts of sterols. The removal can be accomplished by crystallization from a suitable solvent such as methyl alcohol. Also sterols, fatty acids and fats can be removed as a preliminary step by reacting with an alcohol in the presence of a catalyst such as sulfuric acid. This converts these impurities into low boiling esters which can be removed by vacuum distillation. This procedure is described and claimed in Baxter application #355,088 filed August 3, 1940.

The concentrate, which is preferably substantially freed of sterols and acids as described above, is esterified with an aliphatic acylating agent to introduce a fatty acid radical into the tocopherol molecule. Suitable radicles are those of acetic and propionic acids. When a crystalline tocopherol derivative is desired as a final product, acid radicles having at least eleven carbon atoms, such as those of palmitic, lauric, myristic, etc. acids should be used. If ease in crystallization is desired lower molecular weight acids yield crystalline esters especially with cooling during the crystallizing step, thus tocopherol acetate melting point 25–27° C. can be obtained by cooling during crystallization. Acid halides, anhydrides or other similar esterifying forms of the acids may be and preferably are used. The esterification may be carried out in the presence of catalysts such as pyridine and in the presence of heat to increase the speed of the reaction. The esterification may be carried out in the presence of a non-reactive solvent such as benzene, pentane or the like. The reaction mixture is then treated to remove water formed during the reaction unless this has been taken up or removed during the esterification reaction.

When the adsorption step is to be employed the product from the esterification reaction is contacted with an active adsorbent. Impurities are retained by the adsorbent while the tocopherol is recovered in purified form from the filtrate. This is preferably carried out in the presence of a solvent which may be the same solvent which was present during the esterification or which may be a different solvent in which case the esterification solvent will have been removed by vaporization. Suitable solvents are benzene or pentane. Strong adsorbing agents, such as aluminum oxide, are preferred. However, other adsorption agents such as active carbon, silica gel etc. can be used. The adsorbent preferably should be degassed under vacuum to remove oxygen before it is used.

The impurities associated with the tocopherol are adsorbed by the adsorbing agents, while the tocopherol esters pass through in the unadsorbed material or filtrate. Removal of solvent from the filtrate gives a relatively purified product. In some cases it may be desirable to wash the adsorbing agent with the solvent employed in order to remove portions of tocopherol esters which may adhere thereto.

The preparation of pure tocopherol ester from the filtrate is accomplished by subjecting the product produced as described above to crystallization from suitable solvents. This same procedure is also applied to the tocopherol ester from the esterification in case the adsorption step is not employed. In that case the esterification mixture is treated to remove catalyst or unreacted materials. It is preferred to extract the esterification mixture with a tocopherol ester solvent and employ the solvent extract or its non volatile residue for the crystallization step.

The crystallization is accomplished by cooling the tocopherol ester product dissolved in a suitable solvent to a temperature at which the ester separates. The solid ester is then removed by filtering, decantation or similar procedure. The crystallization procedure is of particular value in connection with the higher fatty acid esters which are crystalline at room temperature. However, if sufficiently low temperatures are used for the cooling and filtering steps, this procedure may be used for the preparation of pure esters of the lower acids. High vacuum distillation of the normally liquid esters may be employed as a final step. Solvents such as acetone, methyl and ethyl acetate and ethyl and isopropyl acetates are preferred at crystallizing temperatures of about +5 to −10° C. Carbon tetra chloride, ethyl ether, petroleum ether and propylene oxide can be used at crystallizing temperatures down to −35° C.

In the event that one desires to prepare pure tocopherol in free or alcohol form, the pure ester prepared as described can be saponified. However, since the free tocopherol is easily destroyed, we contemplate saponification of the ester while in the absence of oxygen. This condition can be realized by using an inert gas such as nitrogen or carbon dioxide.

*Example I*

A crude tocopherol concentrate is prepared from "clabber stock," (a scum removed from the deodorizer steam condensate from a vegetable oil deodorizing plant) in the following manner: 8 drums of clabber stock each containing 420 lbs. were combined and mixed with about 100 lbs. of commercial hydrochloric acid (1.13 specific gravity). About 20 lbs. of zinc dust was added and the mixture boiled and stirred for about 15 minutes, settled, the bottom acid layer drained off, water added, the mixture boiled, and finally washed until free of mineral acid. The non-aqueous layer was then filtered to remove zinc dust and carbon which was present in the original starting material. This material having an acid value of about 100 and a tocopherol content of about 6.4% was then dried and degassed by flowing in a thin film by gravity through a chamber heated to about 100° C. and evacuated to about .01 mm. The degassed product was then introduced into a multicolumn molecular still, the first column being heated to about 170° C. to remove a first fraction containing large amounts of free fatty acids and little tocopherol. The undistilled residue was then distilled on the second column, heated to about 180° C. This fraction was returned to the material introduced into the first still. The undistilled residue from the second still was then distilled in a third still having a column heated to approximately 200° C. This distillate contained tocopherol in approximately 12% concentration. However, it contained impurities of various kinds present in the original sludge and including free fatty acids, sterols and oil. In each of the above distillations the vaporizing and condensing surfaces were separated by substantially unobstructed space and the pressure was about .01 to .001 mm., the lower pressures being in the second and third stills.

This distillate was heated with 2 volumes of methyl-alcohol and 1% sulfuric acid for one hour at 65–80° C. Cooling to 2° C. over night caused separation of sterols amounting to 15% of the distillate. These were filtered off, the methyl alcohol removed by distillation at ordinary pressure and 68–100° C. and the residue oil washed twice with water. Distillation in a high vacuum, unobstructed path still then gave the following main fractions:

Fore run 56% tocopherol 2.2%, 110–130° C., .5– .01 mm.
2nd fraction 20% tocopherol 42%, 140–190° C., .01–.003 mm.

One thousand grams of this 2nd fraction concentrate (42%) were dissolved in 2000 g. ethylene chloride and 300 g. pyridine added. The mixture with stirring was cooled to 15° C. and a solution of 580 g. palmityl chloride in 2000 g. ethylene chloride added slowly with continuous cooling and stirring. The clear solution soon began to precipitate pyridine hydrochloride and this process was allowed to proceed for 24 hours at room temperature.

The mixture was then treated with 3 volumes of 1N aqueous hydrochloric acid, the ester extracted with ether, and the extract washed with water, dried, and evaporated. The residue was dissolved in 10 liters of acetone and allowed to stand at room temperature 8 hours to precipitate sterol palmitate. After filtration the filtrate was cooled to a convenient temperature, say between −5° C. and 5° C. to precipitate the tocopherol palmitate. This was filtered and recrystallized from 10% acetone solution. The crystals were then filtered and dried at room temperature. Yield, 350 g. tocopherol palmitate, glossy, transparent lathes, M. P. 38–42° C.

Example II

Fifty grams of the crude 12% distillate prepared as described in Example I were freed of sterols by cooling a 10% solution in methyl acetate to 5° C. over night. The sterols were removed by filtration and the filtrate cooled to −30° C. for one day. Another filtration removed 24 g. of material, chiefly glycerides, but as rich in tocopherol as the starting distillate. Removal of glycerides is more easily effected by alcoholysis as described in Example I which causes little loss of tocopherol. By evaporation of solvent 14.5 gms. of red oil containing 46% tocopherol was obtained.

Esterification

To 100 cc. dry benzene 14.5 g. tocopherol concentrate was added, followed by 10.2 g. palmityl chloride. After standing 48 hours at room temperature the benzene solution was refluxed 1 hour, then the solvent evaporated. The residue was taken up in ether and washed first with 10% potassium carbonate, then water. After drying with sodium sulfate, the ether was removed giving 22.5 g. crude palmitate which was dissolved in 500 cc. benzene for adsorption.

Adsorption

The benzene solution was filtered through a column of aluminum oxide (Brockmann) and washed through with fresh benzene until the washings were colorless. The filtrate was pale greenish yellow in color. Upon evaporation 11.8 g. yellow oil was obtained.

Crystallization

Crude tocopherol palmitate (11.8 g.) was recrystallized successively from 10% methyl acetate, 25% isopropyl alcohol, and 3% absolute ethyl alcohol, giving 2.2 g. crystalline palmitate, plates, melting point 38–42° C. Its extinction coefficient, $E_{1cm}^{1\%}$ (287 mm.) = 38 is the same as pure gamma tocopheryl palmitate.

Our invention has the great advantage that the tocopherol is converted into stable ester form and consequently the tocopherol is protected against oxidation during the entire purification procedure. These esters are of great value because of their crystalline character and consequently they constitute a valuable final product. A peculiar effect of converting into the fatty acid esters is that these esters are not adsorbed on the adsorbing agent as was the case with free tocopherol or other tocopherol esters such as the allophanate. These esters are also completely safe for human consumption so that the conversion into fatty acid esters not only reduces losses, but also yields a product which can be directly used for medicinal purposes.

What we claim is:

1. The process for preparing an improved tocopherol product from a relatively impure source material which contains the tocopherol in free form which process comprises esterifying the impure source material with an aliphatic acylating agent to form a tocopherol fatty acid ester dissolving the ester in a solvent, cooling the solution of tocopherol ester and liquid solvent until crystalline tocopherol esters are formed and separated therefrom and separating the crystalline ester from the liquid solvent.

2. The process for preparing an improved tocopherol product from a relatively impure source material which contains the tocopherol in free form in amounts of about 20–50% which process comprises esterifying the impure source material with an aliphatic acylating agent to form a tocopherol fatty acid ester of an aliphatic acid containing at least 11 carbon atoms, dissolving the crude ester mixture in a relatively volatile solvent, cooling the solution of tocopherol ester and liquid solvent until crystallization of the tocopherol ester and separation of the ester crystals takes place and separating the crystalline ester from the liquid solvent.

3. The process for preparing an improved tocopherol product from a relatively impure source material derived from the lighter-than-water scum by-product of a carrier gas vegetable oil deodorization process which comprises esterifying the impure tocopherol starting material with an aliphatic acylating agent to form a tocopherol fatty acid ester, dissolving the crude mixture in a relatively volatile solvent, cooling the solution of tocopherol ester and liquid solvent until crystallization of the tocopherol ester and separation of the ester crystals takes place and separating the crystalline ester from the liquid solvent.

4. The process for preparing an improved tocopherol product from a relatively impure source material derived from the lighter-than-water scum by-product of a carrier gas vegetable oil deodorization process which contains tocopherol in free form which process comprises esterifying the tocopherol content of the impure source material with an aliphatic acylating agent to form a tocopherol fatty acid ester of an aliphatic acid containing at least 11 carbon atoms, dissolving the crude ester in a relatively volatile solvent, cooling the solution of tocopherol ester and liquid solvent until crystallization of the tocopherol ester and separation of the ester crystals takes place and separating the crystalline ester from the liquid solvent.

5. The process for preparing a tocopherol product of improved stability and concentration from a relatively impure but partially concentrated source material derived from lighter-than-water scum by-products of a vegetable oil steam deodorization plant which process comprises removing impurities such as sterols and acids from the partial concentrate, esterifying with an aliphatic acylating agent to form a tocopherol ester of a fatty acid having at least eleven carbon atoms, dissolving the crude mixture in a relatively volatile solvent, cooling the solution of tocopherol ester and liquid solvent until crystallization of the tocopherol ester and separation of the ester crystals takes place and separating the crystalline ester from the liquid solvent.

6. The process of claim 5 in which the relatively volatile solvent is acetone and the temperature of crystallization is approximately 0 to 5° C.

7. The process for preparing a tocopherol product of improved stability and concentration from a relatively impure source material which contains the tocopherol in free form which process comprises esterifying the impure source material with an aliphatic acylating agent to form a tocopherol ester of a fatty acid having at least eleven carbon atoms, dissolving the crude mixture in a relatively volatile solvent, contacting it with an adsorbing agent, removing the unadsorbed liquid, cooling this liquid until crystallization of the tocopherol ester and separation of the ester crystals takes place, and separating the ester crystals from the liquid solvent and treating it to remove the tocopherol ester therefrom.

8. The process for preparing a tocopherol product of improved stability, and concentration from a relatively impure source material which contains the tocopherol in free form, which process comprises dissolving the impure source material in methyl acetate, cooling to about 5°, filtering, cooling to about −30°, filtering, evaporating the methyl acetate, dissolving the oily residue in benzene, adding palmityl chloride, heating to reflux temperature for about one hour, evaporating off the benzene, dissolving the oil residue in ether, and washing with potassium carbonate solution and water, drying with sodium sulphate, removing the ether by vaporization, dissolving the residue in benzene, passing the solution through aluminum oxide, washing the aluminum oxide with fresh benzene, evaporating the benzene from the filtrate, dissolving the residue in a solvent composed of approximately 10% methyl acetate, 25% isopropyl alcohol, and 3% absolute ethyl alcohol, cooling and separating crystalline tocopherol palmitate having a melting point of approximately 38–42° C.

JAMES G. BAXTER.
CHARLES D. ROBESON.

CERTIFICATE OF CORRECTION.

Patent No. 2,349,273.                                          May 23, 1944.

JAMES G. BAXTER, ET AL.

It is hereby certified that error appears in the printed specification of the above numbered patent requiring correction as follows: Page 4, first column, lines 7 and 8, after "solvent" strike out "and treating it to remove the tocopherol ester therefrom"; and that the said Letters Patent should be read with this correction therein that the same may conform to the record of the case in the Patent Office.

Signed and sealed this 15th day of August, A. D. 1944.

Leslie Frazer (Seal)                                           Acting Commissioner of Patents.